(12) United States Patent
Liu (10) Patent No.: US 10,311,184 B2
(45) Date of Patent: Jun. 4, 2019

(54) CIRCUIT VERIFICATION ON A DISTRIBUTED DATABASE PROCESSING SYSTEM

(71) Applicant: Synopsys, Inc., Mountain View, CA (US)

(72) Inventor: Tayung Liu, Sunnyvale, CA (US)

(73) Assignee: Synopsys, Inc., Mountain View, CA (US)

( * ) Notice: Subject to any disclaimer, the term of this patent is extended or adjusted under 35 U.S.C. 154(b) by 86 days.

(21) Appl. No.: 15/447,010

(22) Filed: Mar. 1, 2017

(65) Prior Publication Data

US 2017/0255727 A1  Sep. 7, 2017

Related U.S. Application Data

(60) Provisional application No. 62/302,686, filed on Mar. 2, 2016.

(51) Int. Cl.
*G06F 17/50* (2006.01)
*G06F 16/27* (2019.01)
(Continued)

(52) U.S. Cl.
CPC ...... *G06F 17/5027* (2013.01); *G06F 16/2379* (2019.01); *G06F 16/2455* (2019.01);
(Continued)

(58) Field of Classification Search
CPC ............. G06F 17/5036; G06F 17/5022; G06F 2217/78; G06F 2217/82; G06F 2217/84;
(Continued)

(56) References Cited

U.S. PATENT DOCUMENTS

2006/0277509 A1* 12/2006 Tung ................... G06F 17/5022
716/109
2008/0077380 A1  3/2008 Tamaki et al.
(Continued)

OTHER PUBLICATIONS

Bhattacharjee A. et al., "Full-System Chip Multiprocessor Power Evaluations Using FPGA-Based Emulation," Proceedings of the 13th International Symposium on Low Power Electronics and Design, ACM, Aug. 11, 2008, pp. 335-340.
(Continued)

*Primary Examiner* — Nghia M Doan
(74) *Attorney, Agent, or Firm* — Fenwick & West LLP (57) ABSTRACT

Example embodiments of disclosed configurations include a process (and system and non-transitory computer storage readable medium) for verifying an operation or a functionality of a design under test (DUT) through a distributed database processing system. In one or more embodiments, the emulator performs emulation of a DUT, and traces signals of the DUT based on the emulation. In one aspect, the traced signals are divided into multiple segments and are stored in the distributed database processing system in a form of key-value pairs. The distributed database processing system generates analysis segments based on corresponding segments of the traced signals and corresponding analysis rules. An analysis rule describes how to determine a particular characteristic of a corresponding segment of a signal. The distributed database processing system aggregates the analysis segments and generates a circuit analysis result indicating an aspect of the functionality of the DUT.

22 Claims, 4 Drawing Sheets

(51) Int. Cl.
*G06F 16/23* (2019.01)
*G06F 16/2455* (2019.01)

(52) U.S. Cl.
CPC .......... *G06F 16/27* (2019.01); *G06F 17/5022* (2013.01); *G06F 2217/04* (2013.01); *G06F 2217/78* (2013.01)

(58) Field of Classification Search
CPC ............. G06F 17/5009; G06F 17/5031; G06F 17/5068
USPC ........ 716/108–109, 113, 115, 120, 133, 136; 703/13–14
See application file for complete search history.

(56) References Cited

U.S. PATENT DOCUMENTS

| | | | |
|---|---|---|---|
| 2009/0271167 A1* | 10/2009 | Zhu | G06F 17/5027 703/14 |
| 2011/0072412 A1 | 3/2011 | Hasslen et al. | |
| 2012/0271574 A1* | 10/2012 | Williams, Jr. | H02J 3/00 702/60 |
| 2016/0098504 A1* | 4/2016 | Larzul | G06F 17/5027 716/136 |

OTHER PUBLICATIONS

European Extended Search Report, European Application No. 17158955.9, dated Aug. 22, 2017, 10 pages.
Ludewig, R. et al., "Power Estimation Based on Transition Activity Analysis with an Architecture Precise Rapid Prototyping System," Proceedings of the 13*th* IEEE International Workshop on Rapid System Prototyping, Jul. 1-3, 2002, pp. 138-143.

* cited by examiner

CIRCUIT VERIFICATION ON A DISTRIBUTED DATABASE PROCESSING SYSTEM

CROSS-REFERENCE TO RELATED APPLICATION

This application claims the benefit of U.S. Provisional Application No. 62/302,686, entitled "Circuit Verification on a Distributed Database," filed Mar. 2, 2016, which is incorporated by reference herein in its entirety.

TECHNICAL FIELD

The disclosure generally relates to emulation of circuits, and more specifically to analyzing emulation results in a distributed database.

BACKGROUND

Emulators have been developed to assist circuit designers in designing and debugging highly complex integrated circuits. An emulator includes multiple reconfigurable components, such as field programmable gate arrays (FPGAs) that together can imitate the operations of a circuit under test (also referred to as a design under test (DUT)). By using an emulator to imitate the operations of a DUT, designers can verify that a DUT complies with various design requirements prior to a fabrication.

Analyzing the functionality or the operation of the DUT (e.g., power analysis) involves emulating the DUT and detecting certain states of multiple signals in the DUT tracked during the emulation. For example, numerous tracking components in addition to DUT are implemented to count a number of toggles for performing power analysis. For each signal that is tracked, an emulator typically has to implement numerous hardware resources (e.g., multiple registers or memories). Accordingly, an amount of resources for confirming the functionality or the operation of the DUT scales according to the number of signals. Hence, a great amount of hardware resources (e.g., processing cycles and/or memory) may have to be implemented by the emulator to accommodate additional hardware components to confirm the functionality or the operation of the DUT. In turn, this slows down the emulation process and limits the size of a DUT for which circuit analysis can be performed. In addition, a large amount of data (e.g., on the order of terabytes), which includes the detected states of the signals, is transferred to a host system for further processing. Transferring data to the host system requires a large amount of data bus or network bandwidth.

Therefore, analyzing the operations of the DUT in a conventional emulation environment is inefficient in terms of hardware and communication resources.

SUMMARY

Example embodiments of disclosed configurations include a process (and system and non-transitory computer storage readable medium) for verifying an operation or a functionality of a design under test (DUT) through a distributed database processing system.

In one or more embodiments, a method of verifying functionality of a design under test (DUT) for manufacture of an integrated circuit is disclosed. The method comprises dividing an input waveform data for the DUT into input waveform segments, the input waveform data including states of a signal; storing the input waveform segments at a distributed database processing system; generating analysis rules, each analysis rule associated with a corresponding one of the input waveform segments, each analysis rule describing how to determine a particular characteristic of a corresponding input waveform segment; storing the analysis rules at the distributed database processing system, the distributed database processing system to generate analysis segments based on the input waveform segments and the analysis rules, each analysis segment indicating a characteristic of one or more corresponding input waveform segments; and retrieving an analysis result from the distributed database processing system, the analysis result representing an aspect of the functionality of the DUT, the analysis result generated at the distributed database processing system based on the analysis segments.

Each of the analysis segments, each of the analysis rules, a combination of them may be generated in a key-value pair.

In one or more embodiments, the characteristic of one or more corresponding input waveform segments is a power consumption of the one or more corresponding input waveform segments, and wherein each analysis segment is stored as a key-value pair.

In one or more embodiments, the characteristic of one or more corresponding input waveform segments is a number of toggles in the one or more corresponding input waveform segments, and wherein each analysis segment is stored as a key-value pair.

In one or more embodiments, each of the analysis segments represents a number of toggles within a corresponding input waveform segment according to the analysis rule, the distributed database processing system is configured to generate the analysis result indicating a peak power consumption of the DUT by (i) multiplying, for each of the analysis segments, the number of toggles with a corresponding coefficient to generate a corresponding power consumption value, and (ii) adding the power consumption values of the analysis segments.

In one or more embodiments, each of the analysis segments represents a number of toggles within a corresponding input waveform segment according to the analysis rule, the distributed database processing system is configured to generate the analysis result indicating an average power consumption of the DUT by (i) multiplying, for each of the analysis segments, the number of toggles with a corresponding coefficient to generate a corresponding power consumption value, and (ii) obtaining an average of the power consumption values of the analysis segments.

In one or more embodiments, a non-transitory computer readable medium storing instructions for verifying a functionality of a design under test (DUT) corresponding to an integrated circuit is disclosed. The instructions when executed by at least one processor causes the processor to: divide an input waveform data for the DUT into input waveform segments, the input waveform data including states of a signal; store the input waveform segments at a distributed database processing system; generate analysis rules, each analysis rule associated with a corresponding one of the input waveform segments, each analysis rule describing how to determine a particular characteristic of a corresponding input waveform segment; store the analysis rules at the distributed database processing system, the distributed database processing system to generate analysis segments based on the input waveform segments and the analysis rules, each analysis segment indicating a characteristic of one or more corresponding input waveform segments; and retrieve an analysis result from the distributed database processing system, the analysis result representing an aspect of the functionality of the DUT, the analysis result generated at the distributed database processing system based on the analysis segments.

In one or more embodiments, a system for verifying a functionality of a design under test (DUT) corresponding to an integrated circuit. The system includes a processor; and a memory comprising instructions executable by the processor. The instructions when executed by the processor cause the processor to: divide an input waveform data for the DUT into input waveform segments, the input waveform data including states of a signal, store the input waveform segments at a distributed database processing system, generate analysis rules, each analysis rule associated with a corresponding one of the input waveform segments, each analysis rule describing how to determine a particular characteristic of a corresponding input waveform segment, store the analysis rules at the distributed database processing system, the distributed database processing system to generate analysis segments based on the input waveform segments and the analysis rules, each analysis segment indicating a characteristic of one or more corresponding input waveform segments, and retrieve an analysis result from the distributed database processing system, the analysis result representing an aspect of the functionality of the DUT, the analysis result generated at the distributed database processing system based on the analysis segments.

DETAILED DESCRIPTION

The figures (FIGS.) and the following description relate to preferred embodiments by way of illustration only. One of skill in the art may recognize alternative embodiments of the structures and methods disclosed herein as viable alternatives that may be employed without departing from the principles of what is disclosed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Example embodiments of disclosed configurations include a process (and system and non-transitory computer storage readable medium) for verifying an operation or a functionality of a design under test (DUT) corresponding to an integrated circuit through a distributed database processing system. In one or more embodiments, the emulator performs emulation of a DUT (or a portion of the DUT), and traces signals of the DUT based on the emulation of the DUT. The distributed database processing system stores the traced signals of the DUT, and generates an analysis result. The analysis result represents a characteristic or an aspect of the operation or the functionality of a DUT.

In one aspect, the traced signals are divided into multiple segments and are stored in the distributed database processing system in a form of key-value pairs. The distributed database processing system also stores analysis rules. Each analysis rule corresponds to one or more segments of the traced signals. An analysis rule describes how to determine a particular characteristic of a corresponding portion (or a segment) of a signal. The distributed database processing system generates analysis segments based on corresponding segments of the traced signals and corresponding analysis rules. Each analysis segment indicates a characteristic of one or more corresponding traced segments. For example, an analysis segment indicates, according to a corresponding analysis rule, a number of toggles or a power consumption of a corresponding traced segment. Moreover, the distributed database processing system aggregates the analysis segments and generates a circuit analysis result. For example, the analysis result indicates a peak power consumption of the DUT or a number of toggles occurred in the DUT.

A signal herein refers to, but is not limited to, a net, a wire, a variable, a port, or an element of a design having a state (e.g., 'HIGH' or 'low', '1' or '0', 'TRUE' or 'FALSE', etc.) carried, monitored or traced.

Advantageously, by generating an analysis result of a DUT using segments of traced signals at the distributed database processing system, efficiency of computing tasks for verifying the functionality of the DUT (or an operational behavior of the DUT) including a large number of signals or one or more signals spanning a large number of DUT clock cycles can be improved. Specifically, the distributed database processing system can generate multiple analysis segments through a parallel process performed at different computing machines (or nodes) of the distributed database processing system. From here the distributed database processing system obtains the analysis result in a time efficient manner without implementing additional hardware components on the emulator for verifying the functionality or the operation of the DUT.

Circuit Verification Environment

Figure 1:
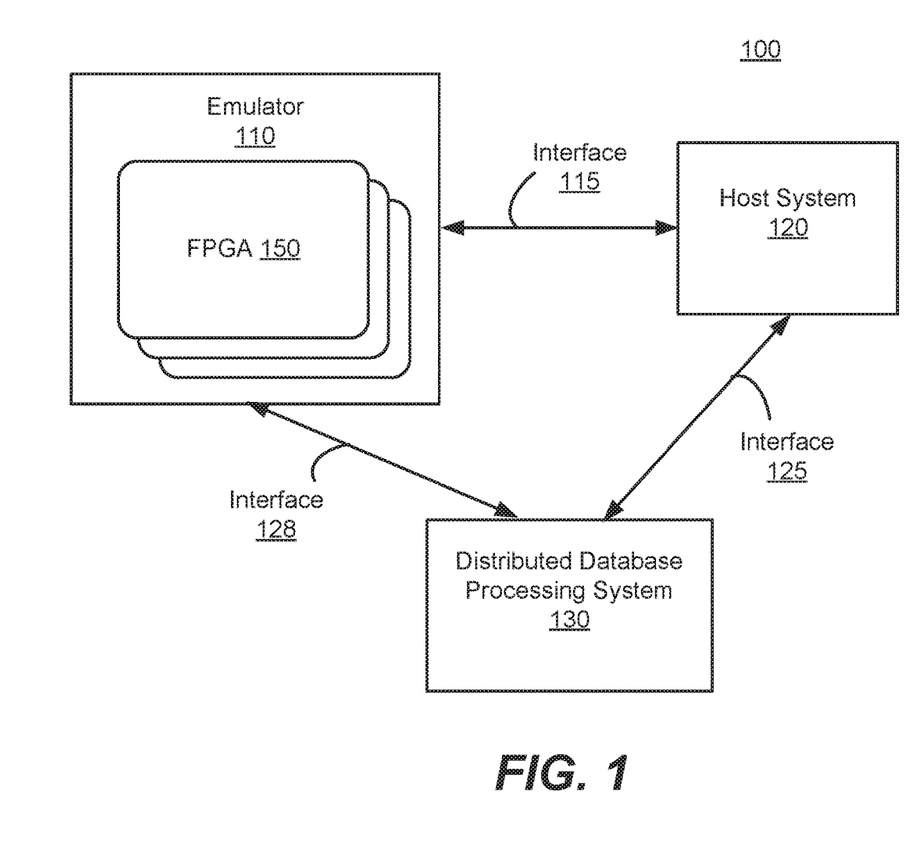
FIG. 1 is a block diagram of an emulation environment, according to one embodiment.

FIG. 1 is a block diagram illustrating an emulation environment 100, according to one example embodiment. The emulation environment 100 includes an emulator 110, a host system 120, and a distributed database processing system 130. The host system 120 communicates with the emulator 110 through an interface 115, and communicates with the distributed database processing system 130 through an interface 125. In one embodiment, the emulator 110 directly communicates with the distributed database processing system 130 through an interface 128. In other embodiments, the interface 128 is omitted, and the emulator 110 communicates with the distributed database processing system 130 through the host system 120 and the interfaces 115 and 125.

The interfaces 115, 125, and 128 are communication mediums that allow communication among the emulator 110, the host system 120, and the distributed database processing system 130. In one embodiment, the interfaces are cables with electrical connections, a wireless communication medium or a network with one or more points of access, or a combination thereof. For example, an interface 115 may be one or more Ethernet, USB, optical, IEEE 1394 (FireWire), or custom built, where the interface 125 may be a wireless communication medium, e.g., employing an IEEE 802.11 protocol, Bluetooth® or Long-Term Evolution (LTE).

The emulator 110 is a hardware system that emulates designs under test (DUTs). A DUT includes one or more circuit designs. The DUT emulated can be either combinatorial, sequential, or a combination of both. The emulator 110 includes multiple field-programmable gate arrays (FPGAs) 150 that can be configured to emulate a DUT. Each FPGA 150 includes a trace memory (e.g., trace buffer) that stores states of signals traced by the FPGA 150 during emulation (e.g., the states of DUT signals during emulation). In other embodiments, the emulator 110 includes other types of configurable logic circuits instead of FPGAs 150. The emulator 110 also can include one or more trace memories separate from the FPGAs 150, where the one or more trace memories can be used by multiple FPGAs 150 for storing data. In other embodiments, the emulator 110 includes a mix of FPGAs 150 or other configurable circuits and a mix of memories located in the components or separated from them, in order to achieve an optimal trace system.

The emulator 110 may transmit states of traced signals stored in one or more trace memories to the distributed database processing system 130 through the interface 128 or through the interface 115, the host system 120 and the interface 125. The states of the traced signals can be transferred to the distributed database processing system 130, the host system 120 or both, after completion of the emulation or during the emulation. The emulator 110 may also transmit states of traced signals stored in one or more trace memories responsive to receiving a request from the host system 120 or prior to receiving a request from the host system 120. The states of the traced signals transmitted to the host system 120 by the emulator 110 can span one or more time frames. Each time frame includes one or more DUT clock cycles. In one aspect, states of signals spanning one or more time frames can be used to construct a waveform for a visual representation. Accordingly, the states of signals spanning one or more time frames are also referred to as waveform data herein.

For a DUT that is to be emulated, the emulator 110 receives from the host system 120 through the interface 115 one or more binary files including a description of the DUT (e.g., a mapping of a gate level or a hardware description language (HDL) level description of the DUT). The binary files describe partitions of the DUT created by the host system 120 and a mapping of each partition to an FPGA 150. Based on the binary files, the emulator 110 configures each FPGA 150 to emulate the partition of the DUT mapped (assigned) to it and to trace certain signals in its respective partition. The FPGAs 150 collectively emulate the DUT. The states of signals traced by an FPGA 150 during emulation are temporarily stored by the FPGA 150 in its trace memory before being transferred to the host system 120 and/or the distributed database processing system 130. These signals are used for generating additional information and/or processing the results of the emulation of the DUT.

The host system 120 configures the emulator 110 to emulate a design under test (DUT). The host system 120 may be a single computer or a collection of multiple computers. In the embodiment where the host system 120 is comprised of multiple computers, the functions described herein as being performed by the host system 120 may be distributed among the multiple computers. The host system 120 may be indirectly connected to the emulator 110 through another device, computer or network.

The host system 120 receives from a user a description of a DUT to be emulated by the emulator 110. In one embodiment, the description of the DUT is in a type of HDL, such as register transfer language (RTL). The host system 120 creates a gate level netlist based on the HDL description of the DUT. The host system 120 uses the HDL or the gate level netlist to partition the DUT into multiple partitions. The host system 120 maps (assigns) each partition to one or more FPGAs 150 included in the emulator 110. Together the FPGAs 150 will emulate the DUT and trace certain signals of the DUT.

The host system 120 creates binary files, which include information to configure the FPGAs 150 based on the DUT and the mappings. A binary file may include, for example, a design description of one or more partitions (e.g., gate level or HDL description), mapping information (e.g., mappings of partitions), connection information (e.g., connections between components of the DUT and/or connections between FPGAs) and design constraints for the DUT.

The host system 120 transmits the binary files to the emulator 110 so that the emulator 110 can configure the FPGAs 150 to emulate their respective mapped partition. The host system 120 instructs the emulator 110 to emulate the DUT. Each FPGA 150 emulates its respective partition and stores states of signals traced during the emulation in its trace memory.

The host system 120 receives states of the traced signals, and provides a graphical representation of states of the traced signals to a user. In one aspect, the host system receives states of the traced signals from the emulator 110 through the interface 115, and generates waveforms of the states of the traced signals. The host system 120 can store the states of the traced signal at the distributed database processing system 130, and retrieve it later through the interface 125 if needed.

The host system 120 presents an analysis result (e.g., event detection or power analysis) of the DUT to a user based on the states of the traced signals for verifying functionality or an operation of the DUT. The host system 120 can perform an analysis on the states of the traced signals to generate the analysis result. Alternatively, the host system 120 causes the distributed database processing system 130 to generate the analysis result based on the states of the traced signals stored at the distributed database processing system 130, and obtains the analysis result from the distributed database processing system 130 through the interface 125, as described in detail below with respect to FIGS. 2-4.

Figure 5:
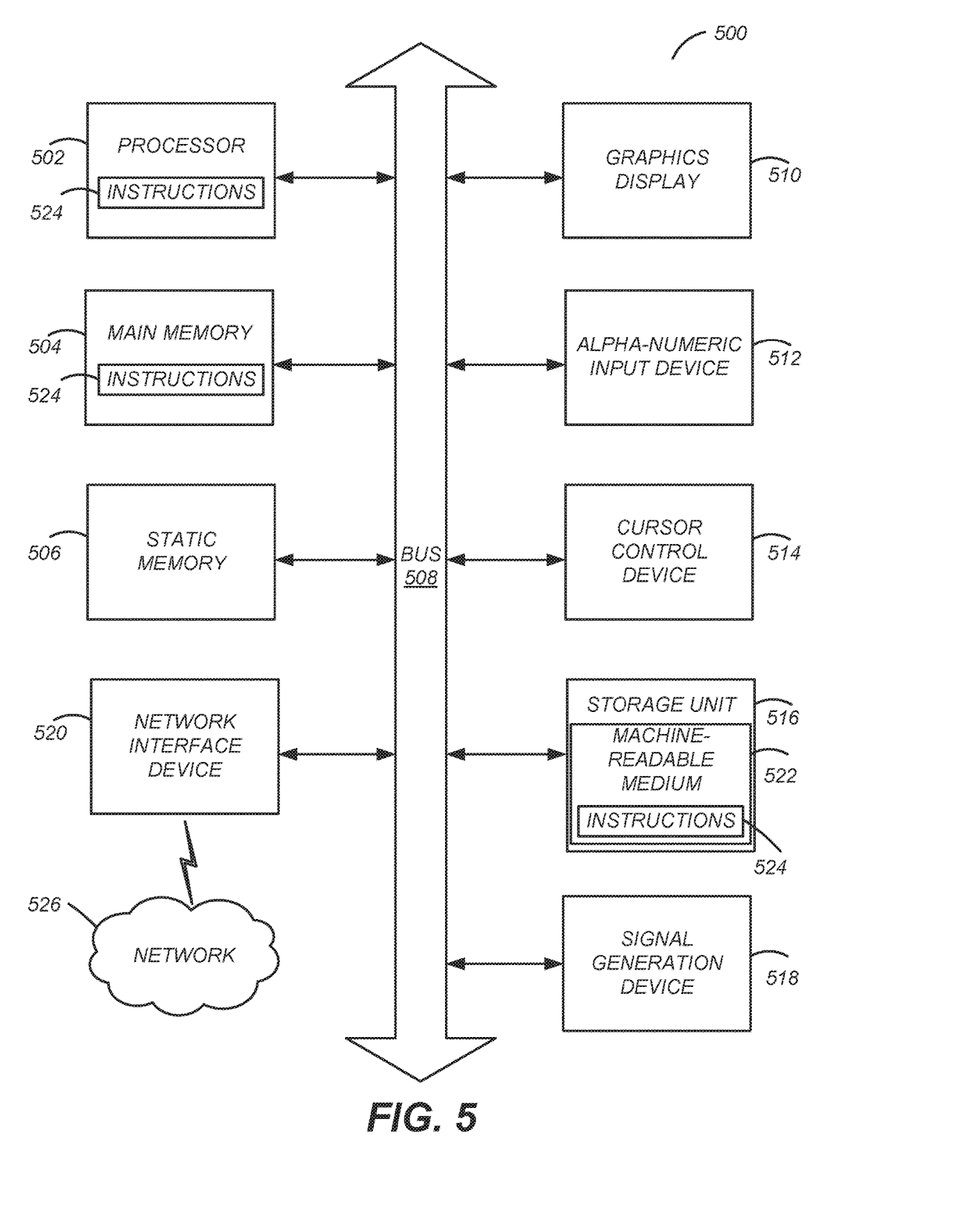
FIG. 5 illustrates one embodiment of components of an example machine able to read instructions from a machine-readable medium and execute them in a processor (or controller).

The distributed database processing system 130 is a repository for storing emulation results. The distributed database processing system 130 includes one or more processors and storage machines (or nodes) to store the emulation results. The distributed database processing system 130 may be embodied as one or more computing machines as shown in FIG. 5. An example platform implemented on the distributed database processing system 130 includes Hadoop. Other platforms for big data analysis may be used. In one aspect, the distributed database processing system 130 receives states of the traced signals traced by the emulator 110 directly through the interface 128, or from the host system 120 through the interface 125 and stores the states of the traced signals. Additionally, the distributed database processing system 130 may generate and store an analysis result of the DUT based on the states of the traced signals. Moreover, the distributed database processing system 130 provides the stored states of the traced signals or the analysis result to the host system 120 through the interface 125. In one or more embodiments, the distributed database processing system 130 is implemented as a computing system as shown in FIG. 5, with a server architecture, software and interface to a storage device.

Figure 2:
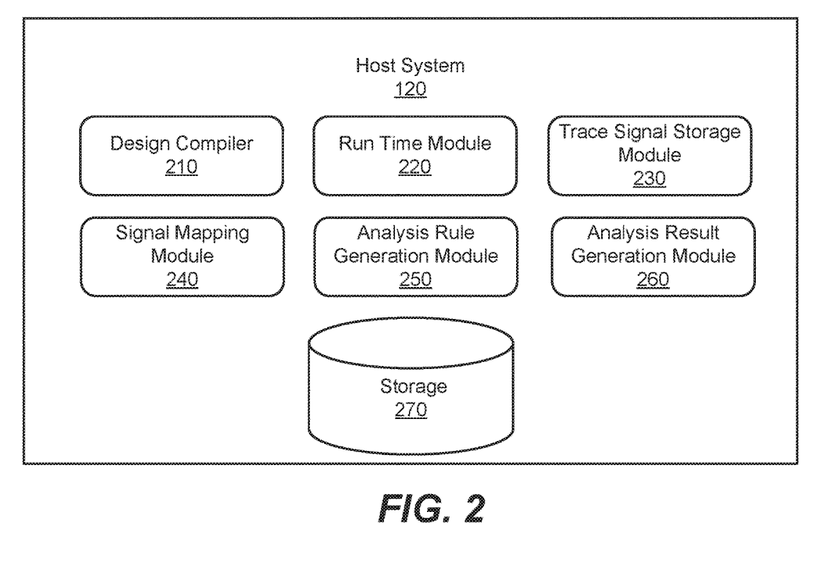
FIG. 2 is a block diagram illustrating a host system, according to one embodiment.

FIG. 2 is a block diagram illustrating the host system 120 in more detail, according to one embodiment. The host system 120 includes a design compiler 210, run time module 220, trace signal storage module 230, signal mapping module 240, analysis rule generation module 250, analysis result generation module 260, and storage 270. Each of these components may be embodied as hardware, software, firmware, or a combination thereof. Additional configuration information for the host system 120 is illustrated in detail with respect to FIG. 5.

The design compiler 210 converts HDL of DUTs into gate level logic. For a DUT that is to be emulated, the design compiler 210 receives a description of the DUT in HDL (e.g., RTL or other level of abstraction). The design compiler 210 synthesizes the HDL of the DUT to create a gate-level netlist with a description of the DUT in terms of gate level logic.

In one aspect, the design compiler 210 maps DUTs to FPGAs 150 of the emulator 110. After the design compiler 210 creates a gate level netlist, the design compiler 210 partitions the DUT at the gate level into a number of partitions using the netlist. In one embodiment, the design compiler 210 partitions the DUT by identifying one or more partitions of the DUT to be emulated based on signals needed to perform analysis of the DUT. The design compiler 210 maps each partition to a corresponding FPGA of the emulator 110. In one approach, the design compiler 210 performs the partitioning and mapping using one or more of the following: design rules, design constraints (e.g., timing or logic constraints), available resources in FPGA 150, limitations on trace memories, gates resulting from the HDL, HDL source code, user inputs, and information about the emulator 110.

The design compiler 210 generates one or more binary files to configure the FPGAs 150 to emulate their respective partition. In one embodiment, the design compiler 210 generates a binary file for each FPGA 150. The design compiler 210 stores the binary files in the storage 270. The design compiler 210 also stores signal information in the storage 270 indicating which signals are traced by each FPGA 150 based on the mappings.

The run time module 220 configures the emulator 110 for performing the emulation of a DUT. The run time module 220 transmits to the emulator 110 via interface 115 binary files stored in the storage 270 for the DUT to configure the FPGAs 150 of the emulator 110 to emulate the DUT. Additionally, the run time module 220 instructs the emulator 110 to emulate the DUT. In one embodiment, prior to the start of the emulation or during the emulation of the DUT, the run time module 220 transmits to the emulator 110 input parameters and/or state machines to configure and control the emulation of the DUT.

The trace signal storage module 230 retrieves states of the signals traced by the emulator 110. The trace signal storage module 230 receives states of the signals directly from the emulator 110 through the interface 115. The trace signal storage module 230 may transmit the received states of the signals to the distributed database processing system 130 for storage and analysis of the DUT. Preferably, the trace signal storage module 230 divides states of the signals (input waveform data) into multiple input waveform segments, and stores the input waveform segments at the distributed database processing system 130. For example, the trace signal storage module 230 divides states of a signal spanning between 0 to 1 ms into hundreds of input waveform segments, in which each input waveform segment includes states of the signal spanning 10 μs. Each segment is stored as a key-value pair at the distributed database processing system 130.

The analysis rule generation module 250 generates analysis rules, and stores the analysis rules at the distributed database processing system 130. An analysis rule describes how to determine a particular characteristic of a corresponding portion (or a segment) of a signal. An analysis rule may be customized or different for each portion of the signal. For example, a first analysis rule defines how to obtain a power consumption of a logic circuit for a first duration (e.g., 10~20 μs), whereas a second analysis rule defines how to obtain a power consumption of the logic circuit for a second duration (e.g., 20~25 μs). For another example, a third analysis rule indicates to count a number of rising edges for a portion of a signal of a logic circuit, and a fourth analysis rule indicates to count a number of toggles for a portion of another signal of the logic circuit. In one aspect, the analysis rules are automatically generated by the analysis rule generation module 250, and stored at the distributed database processing system 130 as key-value pairs. In addition, the analysis rule generation module 250 enables one or more analysis rules to be updated or modified by a user.

The signal mapping module 240 causes the distributed database processing system 130 to generate analysis segments based on input waveform segments. An analysis segment is an indication of a particular status or an event of a corresponding portion (or a segment) of a signal. For example, an analysis segment indicates a power consumption of a particular circuitry for a time period. The signal mapping module 240 causes the distributed database processing system 130 to generate analysis segments for different portions of one or more signals, according to analysis rules indicating how to generate corresponding analysis segments. Preferably, the analysis segments are stored at the distributed database processing system 130 as key-value pairs.

The analysis result generation module 260 causes the distributed database processing system 130 to aggregate one or more analysis segments, and to generate an analysis result. The analysis result represents characteristic of an operation or a functionality of a DUT. For example, the distributed database processing system 130 analyzes one or more analysis segments to generate an analysis result. Each analysis segment may indicate a power consumption of a logic circuit for a different time period. A peak power consumption or an average power consumption of the logic circuit spanning across multiple time periods may be obtained as an analysis result based on analysis segments. The analysis result can be retrieved by the host system 120 and provided for display on a screen, for example for a user to observe.

Figure 3:
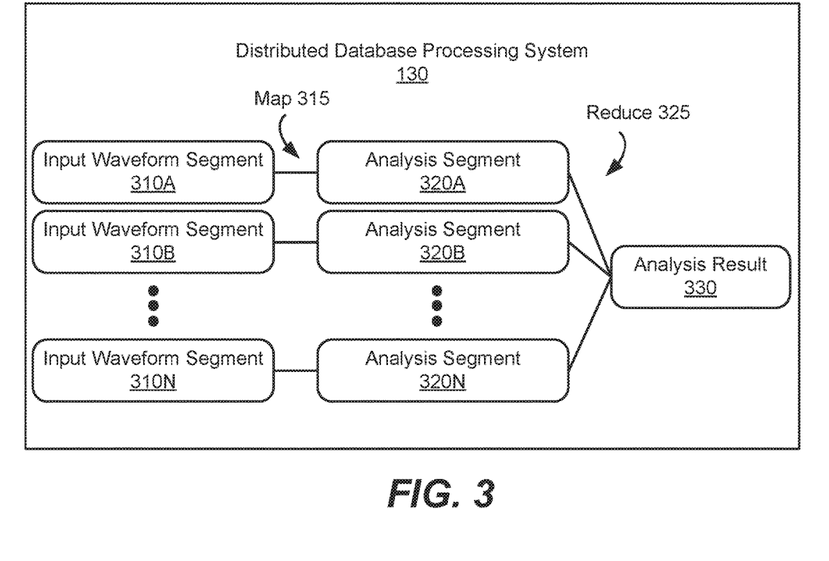
FIG. 3 is a block diagram of a distributed database processing system, according to one embodiment.

FIG. 3 illustrates an example distributed database processing system 130, according to one embodiment. In one embodiment, the distributed database processing system 130 stores input waveform segments 310A, 310B . . . 310N (generally referred to as "an input waveform segment 310"), an analysis segment 320A, 320B . . . 320N (generally referred to as "an analysis segment 320"), and an analysis result 330 as key-value pairs in the distributed database processing system 130. Additionally, the distributed database processing system 130 stores analysis rules (represented as connections between input waveform segments 310 and analysis segments 320) generated by the analysis rule generation module 250 as key-value pairs. Key-value pairs of the input waveform segments 310, the analysis segments 320, and the analysis result 330 can be distributed and stored at different nodes (i.e., computing machines) of the distributed database processing system 130. Additionally, replicates of the key-values pairs can be stored at different nodes for fault tolerance. Additional configuration information for the distributed database processing system 130 is illustrated in detail with respect to FIG. 5.

The input waveform segments 310 are segments of input waveform data. In one implementation, the distributed database processing system 130 divides the states of the traced signals tracked by the emulator 110 into different segments, according to the trace signal storage module 230. In other implementations, the host system 120 divides the states of the traced signals instead. Example formats for each of an input waveform segment 310 includes:
 (i) key=signalId, value=list(time, state),
 (ii) key=signalId+time, value=state,
 (iii) key=signalId+time_range, value=list(time_in_time_range, state).

The analysis segments 320 are generated based on one or more input waveform segments 310 and corresponding analysis rules. In one implementation, each analysis segment 320 is generated through a map function 315 of the distributed database processing system 130 prompted by the signal mapping module 240. The map function 315 executing on the distributed database processing system 130 selects an input waveform segment 310 and obtains an analysis rule corresponding to the input waveform segment 310 for generating the analysis segment 320. An analysis rule corresponding to an input waveform segment 310 can be identified by a matching key. The map function 315 generates analysis segments, for example, in a form of key-value pair by applying one or more input waveform segments to corresponding analysis rules. For example, the map function 315 specifies to count a number of events in an input waveform segment 310, and converts the counted number into corresponding power estimation value, according to an analysis rule corresponding to the input waveform segment 310.

The analysis result 330 indicating characteristic of functionality or an operation of the DUT is generated based on analysis segments 320. In one implementation, the analysis result 330 is generated by a reduce function 325 prompted by the analysis result generation module 260. Specifically, the reduce function 325 analyzes the analysis segments 320, and generates an indication incorporating results obtained in the analysis segments 320. For example, the reduce function 325 gathers analysis segments 320 in which each analyzing segment indicates an amount of a power consumption of a logic circuit during a different time period. Additionally, the reduce function 325 obtains an average power consumption of the logic circuit over multiple time periods by taking an average of amount of power consumption indicated by the analysis segments 320.

In one or more embodiments, reduce function 325 generates the analysis result 330 through a tree structure. For example, the reduce function 325 generates an intermediate analysis segment 320L11 (not shown) as an key-value pair based on analysis segments 320A . . . 320X, generates an intermediate analysis segment 320L12 (not shown) as a key-value pair based on analysis segments 320(X+1) . . . 320(2X). Then, the reduce function 325 generates the analysis result 330 based on the intermediate analysis segments 320L11 and 320L12. In some embodiments, any number of intermediate analysis segments and/or any number levels of intermediate analysis segments in the tree architecture can be generated to obtain the analysis result 330.

Example Map Reduce Implementation

In one example, the distributed database processing system 130 generates a peak power consumption of the DUT. Peak power consumption is a total power consumption at certain time snap shot. One approach of generating the peak power consumption of the DUT can be performed through a following example:

Map(signalId+time T, state) => (time T, power_of_sig_at_T)
Reduce(time T, power_of_sig_at_T) => (time T, power_of_DUT at T).

In the map function 315, the distributed database processing system 130 obtains an input waveform segment 310 including a state of a signal corresponding to a signalId at time T. The distributed database processing system 130 obtains a power analysis rule corresponding to the input waveform segment 310. The distributed database processing system 130 generates a power analysis segment 320 including time T as a key field, and power consumption value of the signal at time T as a value field according to the power analysis rule. The power consumption value of the signal at time T may be obtained by counting a number of changes in the state, and multiplying a coefficient that is proportional to a predicted parasitic capacitance of the signal to the number of changes (or toggles) according to the analysis rule.

In the reduce function 325, the distributed database processing system 130 adds power consumption value indicated by a corresponding power analysis segment 320 for each signal of a DUT to obtain a total power consumption of the DUT at time T. The distributed database processing system 130 generates an analysis result 330 including the time T as a key field, and the total power consumption as a value field.

In one example, the distributed database processing system 130 generates an average power consumption of the DUT. One approach of generating the average power consumption of the DUT can be performed through a following example:

Map(signalId+ T[ ], states) => (T[ ], power_of_sig_in_T[ ])
Reduce(T[ ], power_of_sig_in_T[ ]) => (T[ ], average_power_in_T[ ].

The map function 315 is similar to the map function for obtaining the total power consumption above. Instead of generating power consumption of an input waveform segment 310 at an instance of time T, the distributed database processing system 130 obtains an input waveform segment 310 including states of a signal corresponding to a signalId at a time period T[ ] (i.e., a range of time), and generates a power analysis segment 320 indicating power consumption value for the time period T[ ].

In the reduce function 325, the distributed database processing system 130 adds power consumption values indicated by a corresponding power analysis segment 320 for each signal, then divides the added power consumption values by a range of time period T[ ] to obtain an average power consumption for the time period T[ ]. The distributed database processing system 130 generates an analysis result 330 including the time period T[ ] as a key field, and the average power consumption as a value field.

In one example, the distributed database processing system 130 performs switch activities of the DUT. One approach of analyzing switch activities can be performed through a following example:

```
Map(signalId+time, state) => (time T, TRUE/FALSE)
Reduce(time T, list_of('TRUE')) => (time T, total_number_of_Toggle).
```

For the switch activity analysis, each change in a state of a signal (i.e., toggle) will be counted as one switch activity. In the map function 315, responsive to detecting a toggle, the map function generates an analysis segment 320 including time T as a key field, and 'TRUE' state as a value field. Similarly, responsive to not detecting a toggle, the map function generates an analysis segment 320 including time T as a key field, and 'FALSE' state as a value field.

In the reduce function 325, the distributed database processing system 130 counts a number of 'TRUE' states in all signals of the DUT, and obtains a total number of toggles of the signals of the DUT at time T. The distributed database processing system 130 generates an analysis result 330 including the time T as a key field, and the total number of toggles of the DUT as a value field.

Although not described in detail, in other embodiments, different map/reduce functions can be implemented for performing other circuit analysis, for example, signal timing/delay analysis, antenna/electromagnetic wave effect analysis, etc. through the distributed database processing system 130.

Figure 4:
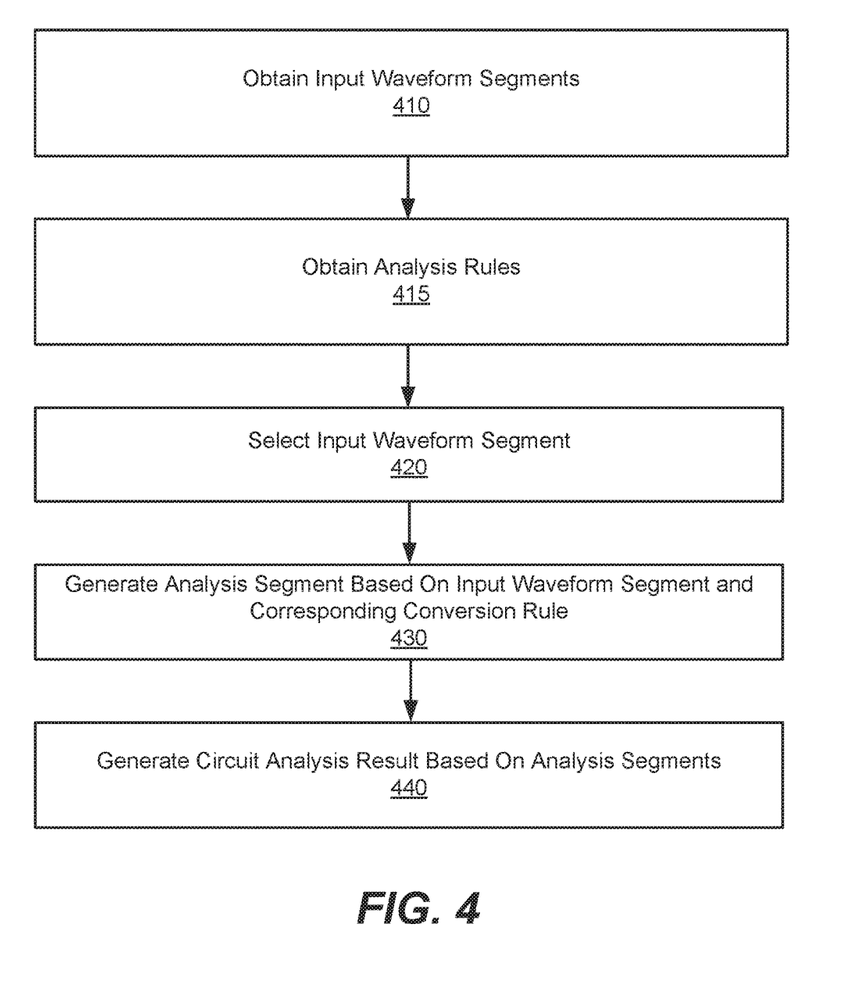
FIG. 4 is a flow chart illustrating the distributed database processing system generating an analysis result of an operation of a DUT, according to one embodiment.

FIG. 4 is a flowchart of illustrating the distributed database processing system 130 performing circuit analysis, according to one example embodiment. The distributed database processing system 130 receives waveform data of a DUT. Additionally, the distributed database processing system 130 generates an analysis result characterizing functionality or an operation of the DUT according to an instruction from the host system 120. Other embodiments can perform the steps of FIG. 4 in different orders. Moreover, other embodiments can include different and/or additional steps than the ones described here.

The distributed database processing system 130 obtains 410 input waveform segments. In one approach, the distributed database processing system 130 receives input waveform data including states of signals of a DUT traced by the emulator 110 directly from the emulator 110 through the interface 128 or from the host system 120 through the interface 125. Moreover, the distributed database processing system 130 divides the input waveform data into multiple input waveform segments and stores the input waveform segments as key-value pairs. In another approach, the host system 120 divides the input waveform data into multiple input waveform segments and the distributed database processing system 130 receives input waveform segments from the host system 120.

The distributed database processing system 130 obtains 415 and stores analysis rules from the host system 120. One or more analysis rules are associated with one or more input waveform segments. The distributed database processing system 130 selects 420 an input waveform segment, and obtains a corresponding analysis rule. The distributed database processing system 130 generates 430 analysis segments by applying input waveform segments to corresponding one or more analysis rules. The distributed database processing system 130 aggregates analysis segments and generates 440 a circuit analysis result based on the analysis segments.

Computing Machine Architecture

Turning now to FIG. 5, it is a block diagram illustrating components of an example machine able to read instructions from a machine-readable medium and execute them in a processor (or controller). Specifically, FIG. 5 shows a diagrammatic representation of a machine in the example form of a computer system 500 within which instructions 524 (e.g., software or program code) for causing the machine to perform (execute) any one or more of the methodologies described with FIGS. 1-4. The computer system 500 may be used for one or more of the entities (e.g., host system 120, emulator 110, and one or more computing machines (nodes) of the distributed database processing system 130) illustrated in the emulation environment 100 of FIG. 1.

The example computer system 500 includes one or more processors (generally, processor 502) (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 504, and a static memory 506, which are configured to communicate with each other via a bus 508. The computer system 500 may further include graphics display unit 510 (e.g., a plasma display panel (PDP), a liquid crystal display (LCD), a projector, or a cathode ray tube (CRT)). The computer system 500 may also include alpha-numeric input device 512 (e.g., a keyboard), a cursor control device 514 (e.g., a mouse, a trackball, a joystick, a motion sensor, or other pointing instrument), a storage unit 516, a signal generation device 518 (e.g., a speaker), and a network interface device 520, which also are configured to communicate via the bus 508.

The storage unit 516 includes a machine-readable medium 522 on which is stored instructions 524 embodying any one or more of the methodologies or functions described herein. The instructions 524 may also reside, completely or at least partially, within the main memory 504 or within the processor 502 (e.g., within a processor's cache memory) during execution thereof by the computer system 500, the main memory 504 and the processor 502 also constituting machine-readable media. The instructions 524 may be transmitted or received over a network 526 via the network interface device 520.

While machine-readable medium 522 is shown in an example embodiment to be a single medium, the term "machine-readable medium" should be taken to include a single medium or multiple media (e.g., a centralized or distributed database, or associated caches and servers) able to store instructions (e.g., instructions 524). The term "machine-readable medium" shall also be taken to include any medium that is capable of storing instructions (e.g., instructions 524) for execution by the machine and that cause the machine to perform any one or more of the methodologies disclosed herein. The term "machine-readable medium" includes, but not be limited to, data repositories in the form of solid-state memories, optical media, and magnetic media.

As is known in the art, a computer system 500 can have different and/or other components than those shown in FIG. 5. In addition, the computer system 500 can lack certain illustrated components. For example, a computer system 500 acting as the emulator 110 may include a hardware processor 502, a storage unit 516, a network interface device 520, and multiple configurable logic circuits (as described above with reference to FIG. 1), among other components, but may lack an alphanumeric input device 512 and a cursor control device 514. For another example, a computer system 500 acting as one or more computing machines of the distributed database processing system 130 may include a hardware processor 502, a plurality of storage units 516, a network interface device 520, but may lack an alphanumeric input device 512 and a cursor control device 514.

Additional Configuration Considerations

It is noted that although the configurations as disclosed are in the context of analyzing emulation results, the principles disclosed herein can be applied to any waveform (e.g., simulation result) with a large volume of data. Advantages of the disclosed configurations include performing circuit analysis in segments through a parallel process at distributed nodes (computing machines), and generating an analysis result indicating characteristic of a functionality or an operation of a DUT by incorporating the segments of circuit analysis performed. Accordingly, efficiency of computing tasks for verifying the functionality of a DUT including a large number of signals can be improved. For example, performing a power analysis of a user design circuit including 100 million signals over a million cycle span through a conventional approach can take several days or over a week. By performing power analysis through a parallel process at distributed nodes as disclosed herein, a result of the power consumption of the user design can be obtained within a few hours.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated in FIG. 2. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 502, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process of verifying an operation of a design under test using a distributed database processing system through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method of verifying functionality of a design under test (DUT) for manufacture of an integrated circuit, the method comprising:
   receiving, at a host system, from a hardware emulator comprising at least one field-programmable gate array (FPGA) configured to emulate the DUT, input waveform data including states of a signal of the DUT traced by the hardware emulator;
   dividing, at the host system, the input waveform data into input waveform segments;
   storing the input waveform segments at a distributed database processing system in communication with the host system;
   generating analysis rules, each analysis rule associated with a corresponding one of the input waveform segments, each analysis rule describing how to determine a particular characteristic of a corresponding input waveform segment;
   storing the analysis rules at the distributed database processing system, the distributed database processing system configured to map each input waveform segment to the corresponding analysis rule and generate analysis segments based on the input waveform segments and the corresponding analysis rules, each analysis segment indicating a characteristic of one or more corresponding input waveform segments; and
   retrieving, at the host system, an analysis result from the distributed database processing system, the analysis result representing an aspect of the functionality of the DUT, the analysis result generated at the distributed database processing system based on the analysis segments.

2. The method of claim 1, wherein each of the analysis segments is generated in a key-value pair.

3. The method of claim 1, wherein each of the analysis rules is generated in a key-value pair.

4. The method of claim 1, wherein the characteristic of one or more corresponding input waveform segments is a power consumption of the one or more corresponding input waveform segments, and wherein each analysis segment is stored as a key-value pair.

5. The method of claim 1, wherein the characteristic of one or more corresponding input waveform segments is a number of toggles in the one or more corresponding input waveform segments, and wherein each analysis segment is stored as a key-value pair.

6. The method of claim 1, wherein each of the analysis segments represents a number of toggles within a corresponding input waveform segment according to the analysis rule, the distributed database processing system configured to generate the analysis result indicating a peak power consumption of the DUT by (i) multiplying, for each of the analysis segments, the number of toggles with a corresponding coefficient to generate a corresponding power consumption value, and (ii) adding the power consumption values of the analysis segments.

7. The method of claim 1, wherein each of the analysis segments represents a number of toggles within a corresponding input waveform segment according to the analysis rule, the distributed database processing system configured to generate the analysis result indicating an average power consumption of the DUT by (i) multiplying, for each of the analysis segments, the number of toggles with a corresponding coefficient to generate a corresponding power consumption value, and (ii) obtaining an average of the power consumption values of the analysis segments.

8. A non-transitory computer readable medium storing instructions for verifying a functionality of a design under test (DUT) corresponding to an integrated circuit, the instructions when executed by at least one processor causes the processor to:
   receiving, at a host system, from a hardware emulator comprising at least one field-programmable gate array (FPGA) configured to emulate the DUT, input waveform data including states of a signal of the DUT traced by the hardware emulator;
   divide, at the host system, the input waveform data for the DUT into input waveform segments;
   store the input waveform segments at a distributed database processing system in communication with the host system;
   generate analysis rules, each analysis rule associated with a corresponding one of the input waveform segments, each analysis rule describing how to determine a particular characteristic of a corresponding input waveform segment;
   store the analysis rules at the distributed database processing system, the distributed database processing system configured to map each input waveform segment to the corresponding analysis rule and generate analysis segments based on the input waveform segments and the corresponding analysis rules, each analysis segment indicating a characteristic of one or more corresponding input waveform segments; and retrieve, at the host system, an analysis result from the distributed database processing system, the analysis result representing an aspect of the functionality of the DUT, the analysis result generated at the distributed database processing system based on the analysis segments.

9. The non-transitory computer readable medium of claim 8, wherein each of the analysis segments is generated in a key-value pair.

10. The non-transitory computer readable medium of claim 8, wherein each of the analysis rules is generated in a key-value pair.

11. The non-transitory computer readable medium of claim 8, wherein the characteristic of one or more corresponding input waveform segments is a power consumption of the one or more corresponding input waveform segments, and wherein each analysis segment is stored as a key-value pair.

12. The non-transitory computer readable medium of claim 8, wherein the characteristic of one or more corresponding input waveform segments is a number of toggles in the one or more corresponding input waveform segments, and wherein each analysis segment is stored as a key-value pair.

13. The non-transitory computer readable medium of claim 8, wherein each of the analysis segments represents a number of toggles within a corresponding input waveform segment according to the analysis rule, wherein the analysis result indicates a peak power consumption of the DUT, and wherein the instruction when executed by the processor to cause the processor to generate the analysis result indicating the peak power consumption of the DUT by (i) multiplying, for each of the analysis segments, the number of toggles with a corresponding coefficient to generate a corresponding power consumption value, and (ii) adding the power consumption values of the analysis segments.

14. The non-transitory computer readable medium of claim 8, wherein each of the analysis segments represents a number of toggles within a corresponding input waveform segment according to the analysis rule, wherein the analysis result indicates an average power consumption of the DUT, and wherein the instruction when executed by the processor to cause the processor to generate the analysis result indicating the average power consumption of the DUT by (i) multiplying, for each of the analysis segments, the number of toggles with a corresponding coefficient to generate a corresponding power consumption value, and (ii) obtaining an average of the power consumption values of the analysis segments.

15. A system for verifying a functionality of a design under test (DUT) corresponding to an integrated circuit, the system comprising:
a processor; and
a memory comprising instructions executable by the processor, the instructions when executed by the processor cause the processor to:
receiving, at a host system, from a hardware emulator comprising at least one field-programmable gate array (FPGA) configured to emulate the DUT, input waveform data including states of a signal of the DUT traced by the hardware emulator,
divide, at the host system, the input waveform data into input waveform segments,
store the input waveform segments at a distributed database processing system in communication with the host system,
generate analysis rules, each analysis rule associated with a corresponding one of the input waveform segments, each analysis rule describing how to determine a particular characteristic of a corresponding input waveform segment,
store the analysis rules at the distributed database processing system, the distributed database processing system configured to map each input waveform segment to the corresponding analysis rule and generate analysis segments based on the input waveform segments and the corresponding analysis rules, each analysis segment indicating a characteristic of one or more corresponding input waveform segments, and
retrieve, at the host system, an analysis result from the distributed database processing system, the analysis result representing an aspect of the functionality of the DUT, the analysis result generated at the distributed database processing system based on the analysis segments.

16. The system of claim 15, wherein each of the analysis segments is generated in a key-value pair.

17. The system of claim 15, wherein each of the analysis rules is generated in a key-value pair.

18. The system of claim 15, wherein the characteristic of one or more corresponding input waveform segments is a power consumption of the one or more corresponding input waveform segments, and wherein each analysis segment is stored as a key-value pair.

19. The system of claim 15, wherein the characteristic of one or more corresponding input waveform segments is a number of toggles in the one or more corresponding input waveform segments, and wherein each analysis segment is stored as a key-value pair.

20. The system of claim 15, wherein the aspect of the functionality of the DUT is a peak power consumption or an average power consumption of the DUT.

21. A method of verifying functionality of a design under test (DUT) for manufacture of an integrated circuit, the method comprising:
dividing an input waveform data for the DUT into input waveform segments, the input waveform data including states of a signal;
storing the input waveform segments at a distributed database processing system;
generating analysis rules, each analysis rule associated with a corresponding one of the input waveform segments, each analysis rule describing how to determine a particular characteristic of a corresponding input waveform segment;
storing the analysis rules at the distributed database processing system, the distributed database processing system to generate analysis segments based on the input waveform segments and the analysis rules, each analysis segment representing a number of toggles within a corresponding input waveform segment according to the analysis rule; and
retrieving an analysis result from the distributed database processing system, the analysis result representing a peak power consumption of the DUT, the analysis result generated at the distributed database processing system by (i) multiplying, for each of the analysis segments, the number of toggles with a corresponding coefficient to generate a corresponding power consumption value, and (ii) adding the power consumption values of the analysis segments.

22. A method of verifying functionality of a design under test (DUT) for manufacture of an integrated circuit, the method comprising:
dividing an input waveform data for the DUT into input waveform segments, the input waveform data including states of a signal;
storing the input waveform segments at a distributed database processing system;
generating analysis rules, each analysis rule associated with a corresponding one of the input waveform segments, each analysis rule describing how to determine a particular characteristic of a corresponding input waveform segment;
storing the analysis rules at the distributed database processing system, the distributed database processing system to generate analysis segments based on the input waveform segments and the analysis rules, each analysis segment representing a number of toggles within a corresponding input waveform segment according to the analysis rule; and
retrieving an analysis result from the distributed database processing system, the analysis result representing an average power consumption of the DUT, the analysis result generated at the distributed database processing system by (i) multiplying, for each of the analysis segments, the number of toggles with a corresponding coefficient to generate a corresponding power consumption value, and (ii) obtaining an average of the power consumption values of the analysis segments.

* * * * *